Oct. 17, 1950  M. E. WHITLEY, JR  2,526,057

AUTOMOBILE LUBRICATION CHECK CHART

Filed Dec. 24, 1948

INVENTOR.
Morse E. Whitley Jr.,
BY Scott L. Norvel
ATTORNEY

Patented Oct. 17, 1950

2,526,057

UNITED STATES PATENT OFFICE 2,526,057

AUTOMOBILE LUBRICATION CHECK CHART

Morse E. Whitley, Jr., Maricopa County, Ariz.

Application December 24, 1948, Serial No. 67,223

5 Claims. (Cl. 177—311)

1

This invention pertains to automobile lubrication check charts.

One of the objects of this invention is to provide a large wall board chart which will clearly display a diagram simulating an automobile chassis with electric lights positioned at significant points thereon which indicate points to be lubricated, and with switches conveniently located at the bottom of the chart board, having indicia the same as the several lubrication point lamps, connected therewith by broad visible bands or stripes, and operative to light or extinguish the lights on the chassis, as desired by the operator;

Another object is to provide a large board with a chart thereon simulating an automobile chassis, with lights thereon indicating various points to be lubricated and with switches along the bottom of the board adapted to control said lights so that a person lubricating an automobile can easily turn said lights on and off, even with greasy hands as the job of lubrication proceeds.

Another object is to provide a check board, as above described, which can be easily, cheaply, and safely built and operated and provided with switches controlled by knobs conveniently positioned on the board which may be maintained by an operator lubricating a car even with greasy hands, and with main control switches which will light the entire group of lights on the outline of the chassis or certain special groups thereof, optionally, as desired;

Another object is to provide an electrical switching arrangement for the lights on said chart board whereby, after a lubrication job has been completed and the lights turned off as the various points are lubricated, the entire bank of lights may be relighted and readied for a new job by merely resetting the master switches without the necessity of resetting the switches controlling the individual lubricating point lamps;

Still another object is to provide lamps of different colors to indicate and distinguish lubrication points requiring lubrication at different intervals;

A general object is to provide a chart as above mentioned which may be installed on the wall of a garage lubrication stall so as to clearly indicate to the customer and the operator, as well, the nature and extent of the lubrication job required and its progress as the work is performed.

Other objects will appear hereinafter.

I attain the foregoing objects by means of the

2 devices, construction, and arrangement of parts illustrated in the accompanying drawings in which—

Figure 1:
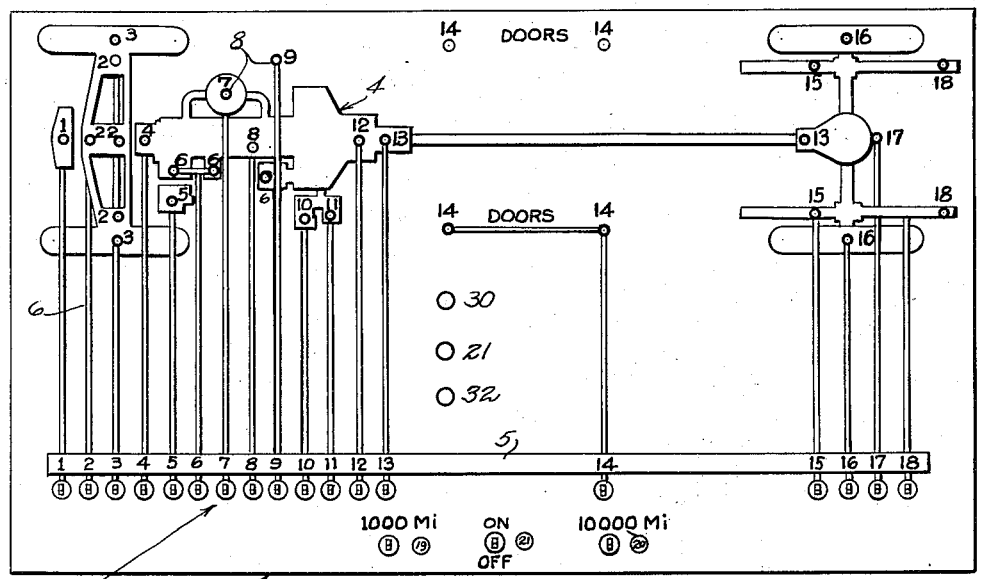
Figure 1, is a front elevational view of the chart board.

In the drawing, 2 indicates the board on which the chart 3 is printed. On the chart a figure 4, simulating a plan view of an automobile chassis is painted. Along the bottom portion of the board is a rail 5 on which a number of lubricating points indicating switches 1 through 18 are located.

These switches are designated by numerals or other indicia to correspond with lights 8 set in sockets on board 2 at positions on chassis figure 4, which, in turn indicate corresponding oiling or greasing points on the chassis of a car to be lubricated.

The background of chart 4 is preferably painted white, the chassis figure thereon may then be painted black. From each light, set, or group of lights on the chassis figure broad bands or strips may then be painted leading directly to the switch controlling these lights. Thus, for example, the switch marked 2 on the left of the board is connected by band or stripe 6 to lights 2 indicating lubricating points on the steering gear knuckles. This same system of marking follows through from the front of the chassis figure 4 to the rear.

Figure 2:
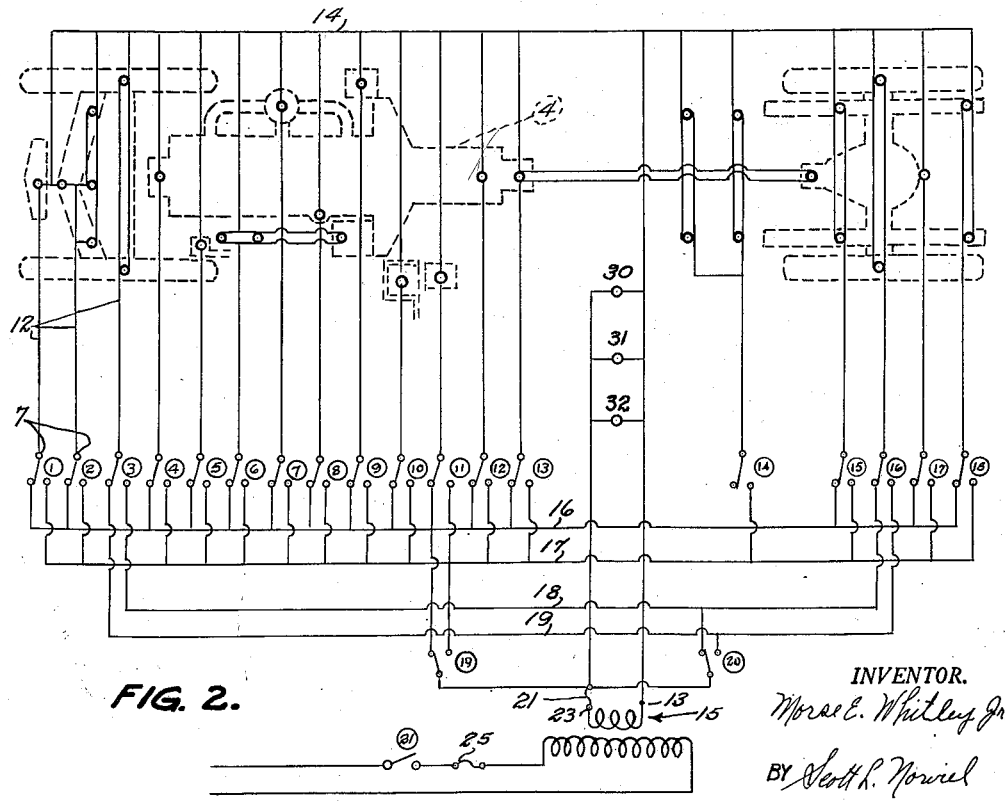
Figure 2 is the electrical wiring diagram of the circuits, switches and lamps used on said chart.

Referring to the electrical diagram, Figure 2, it is noted that each of switches 7 is of the single pole double throw type. The pole contact of each switch is connected by a lead 12 to one terminal of the socket or sockets of each significant light or light group indicating a lubricating point. The other socket terminal of each light is connected to a common ground lead 14 which, in turn, is connected to terminal 13 of the secondary of stepdown transformer 15.

The two pole contact terminals of each of these switches lead to busses 16 and 17, respectively, except the pole contacts of switches 3 and 16. These are connected to busses 18 and 19. Busses 16 and 17 are connected to the pole contacts of single pole double throw switch 19. The pole of this switch is connected through fuse 21 to terminal 23 of transformer 15. Busses 18 and 19 are similarly connected through switch 20 to this same transformer terminal. The primary of transformer 15 is connected through fuse 25 and main switch 21 to the alternating current supply lines.

The globes of all lamps controlled by switches 1 through 12 and 14, 17 and 18 are colored red to indicate that the lubrication points indicated by these are to be lubricated each 1000 miles.

The globes of the lamps controlled by switches 13 and 15 are preferably colored amber to indicate that they are special lubricating points, and are to be lubricated only on automobiles requiring universal joint and spring leaf lubrication.

The globes of lamps controlled by switches 3 and 16 are preferably colored green, for contrast. These indicate wheel bearing lubrication points and are used only on jobs where this type of lubrication is necessary.

All of the switches 1 through 18 except 3 and 16 are energized by job set switch 19 which may be termed the 1000 mile switch. Switches 3 and 16 are energized by job set switch 20 which may be termed the 10,000 mile switch.

It is to be noted that, as shown, all switches 1 through 18 except 3 and 16 are positioned so that the pole is in contact with the switch terminal leading to buss 16, and job switch 19 is likewise connected to this buss. Therefore all lamps on the chassis diagram except 3 and 16 are illuminated. However, lamps 3 and 16 are also shown as illuminated by the setting of switch 20 which connects the transformer terminal 23 to buss 18.

In use, as each lubrication job or operation is completed the operator throws each switch—1 through 18—to the terminal connected to the unenergized buss, 17. The same is true of switches 3 and 16 which are thrown to buss 18 as the operations indicated are completed. Whereas, at the start of each job, all lamps are lit, as indicated in Figure 2, upon completion of each lubricating job the chart is dark, so far as operation lamps are concerned, and all the switch poles are connected to unenergized busses.

When a new job is started, however, switch 19 is thrown to the right and connects the transformer terminal 23 to buss 17. This illuminates all these corresponding indicating lamps. If a 10,000 mile job is desired, switch 20 is likewise operated. Therefore, to reset the indicating lights only one operation of the reset switch 19 and/or 20 is required.

Reminder lamps 30 colored red, 31, colored amber, and 32, colored green, are positioned in the approximate middle of the chart and connected directly to transformer. These serve to indicate when main power switch 21 is closed, and also to remind the operator of the significance of the colors of the operation lamps.

From the foregoing it will be seen that I have provided a check chart which is easy to use, foolproof, and on which all operations are clearly indicated. By using six volts, E. M. F. from step-down transformer 15 all connections are easily made, insulation is minimized, the entire wiring system is safe from fire hazard, and the operator need not risk chance of shock in operating the switches. While the switches have been described as the single pole double throw type it is to be understood that their mechanism may include the push-pull type, the rotary type or the single blade type. It is also to be understood that the lamps may be set in any kind of sockets attached to either the front or the back of the board.

Obviously, all wiring is on the back of the board. The stripes connecting these lamps to their operative switches may also be painted other colors than above indicated so as to enhance their contrast from the background of the board.

Having now fully described my invention and explained its use, I wish to be limited only by the claims.

I claim:

1. An automobile lubrication check chart comprising a board, a chart having a figure simulating the plan of an automobile chassis thereon; electric lamps positioned on said figure indicating critical points to be lubricated, one of the terminals of each of said lamps being joined and connected to one terminal of a source of electrical energy adapted to light said lamps; single pole double throw job switches arranged along the lower portion of said board having their poles connected to the other terminal of each of said lamps and their contact terminals connected to two separate busses so that said terminal can be switched to either of said two busses; an energizing switch adapted to connect either of said busses to said source of electrical energy; and stripes painted on said board extending directly from each switch to the lamp indicating the corresponding part to be lubricated.

2. An illuminated automobile lubrication check chart comprising a board; a chart having a figure simulating the plan of an automobile chassis drawn thereon; electric lamps positioned on said figure at selected points indicating critical points to be lubricated; a wiring system including electric conducting wires and busses connected so that one of the terminals of each of said lamps is connected to a common conductor leading to one terminal of an electric power supply, the other terminal of each of said lamps being connected to the pole of a double throw job switch, each of the contact terminals of said switch being connected to each of two busses; a single pole double throw job switch connected to the other terminal of said power supply and its contact terminals to said busses respectively, so that either of said busses may be energized; said switches controlling said lights being arranged along the bottom of said board in a horizontal row, and each being positioned below the lights which it controls, and a stripe marked on said board leading from each switch to the light positioned on said chassis figure, which it controls.

3. An automobile lubrication check chart comprising a board, a chart having a figure simulating the plan of an automobile chassis thereon; a plurality of groups of electric lamps positioned on said figure indicating critical points to be lubricated, lamps of said groups having distinctive contrasting colors, one of the terminals of each of said lamps being joined and connected to one terminal of a source of electrical energy adapted to light said lamps; single pole double throw job switches arranged along the lower portion of said board, having their poles connected to the other terminal of each of said lamps and their contact terminals connected to two separate busses so that said terminal can be switched to either of said two busses; an energizing switch for each of said groups of electric lamps adapted to connect either of said bus bars connected to lamp terminal in said group to said source of electrical energy; and stripes painted on said board extending directly from each switch to the lamp indicating the corresponding part to be lubricated.

4. An automobile lubrication check chart comprising a board, a chart having a figure simulating the plan of an automobile chassis thereon; a plurality of groups of electric lamps positioned on said figure indicating critical points to be lubricated, lamps of said groups having distinctive contrasting colors, one of the terminals of each of said lamps being joined and connected to one terminal of a source of electrical energy adapted to light said lamps; single pole double throw job switches arranged along the lower portion of said board, having their poles connected to the other terminal of each of said lamps and their contact terminals connected to two separate busses so that said terminal can be switched to either of said two busses; an energizing switch for each of said groups of electric lamps, said parts being arranged so that, with the job switches all set to contact one bus, all lamps may be lit by throwing the energizing switch to a position to energize said bus and other said lamps may be extinguished one at a time by throwing said job switches to contact the other unenergized bus; whereby they may be again lighted by energizing said other bus.

5. An illuminated automobile lubrication check chart comprising a board adapted to be attached to the wall of a garage, a chart containing the diagram of an automobile chassis marked thereon; electric lamps positioned at selected points on said diagram indicating points to be lubricated on an automobile; single pole double throw lamp switches located in a horizontal row near the bottom of said board so that each is positioned below one of said lamps; double throw energizing switches positioned and operable on said board; means for lighting said lamps as a group and for turning them off individually, as lubricating jobs are completed, including said lamp switches and electrical connections and busses including connections between one terminal of each of said lamps and the pole of each lamp switch, connections between the contact terminals and each of two separate busses, said busses being connected, in turn, to the two contact terminals, respectively, of such energizing switch, together with a power supply, an electrical connection from one side thereof to one terminal of said lamps, and connections from the other side of said power supply to the pole of said energizing switches; said parts being arranged so that after said power supply switch has been thrown to one of its contacts, and said lamp switches thrown to contact the bus connected therewith, said lamps may then be extinguished, one by one, as lubrication jobs are performed, by throwing said lamp switches to the unenergized bus, and said lamps may be relighted by throwing said power switch to contact said previously unenergized bus.

MORSE E. WHITLEY, Jr.

REFERENCES CITED

The following references are of record in the file of this patent:

UNITED STATES PATENTS

| Number | Name | Date |
|---|---|---|
| 998,299 | Nolen et al. | July 18, 1911 |
| 2,085,920 | McCoy | July 6, 1937 |
| 2,159,925 | Wood | May 23, 1939 |
| 2,259,123 | Wells et al. | Oct. 14, 1941 |